Patented Feb. 1, 1949

2,460,471

UNITED STATES PATENT OFFICE 2,460,471

METHOD AND APPARATUS FOR MEASURING PERSISTENCE SCREEN CHARACTERISTICS

Otto Heinrich Schade, West Caldwell, N. J., assignor to Radio Corporation of America, a corporation of Delaware Application December 7, 1945, Serial No. 633,492

17 Claims. (Cl. 315—364)

1

This invention relates to the art of measuring light output characteristics of phosphor-coated screens, particularly the type of screen used in cathode ray oscilloscope tubes. Still more specifically the invention has been developed for use in connection with the cascade type screen having long persistence.

In the manufacture of cathode ray tubes it is highly desirable to have some method of comparing and rating the light output characteristics of the screens incorporated therein. This is true of cathode ray screens in general but particularly is it true of those screens having long persistence characteristics due to the presence of a layer of phosphorescent material. The present invention provides a practical method of measuring the light output characteristics of any luminescent screen which can be excited to produce a light output due to electron bombardment as well as providing portable apparatus easily assembled and used. The invention has been found particularly useful in testing the luminescent screens of tubes to be used in radar equipment where the screen is required to meet rigid and exacting specifications.

One type of long persistence screen is known as a P7 screen and consists of a primary layer of yellow zinc cadmium sulfide applied directly to the bulb face and a secondary layer of blue zinc sulfide applied on top of the primary layer. In operation, the secondary layer of zinc sulfide is excited to blue fluorescence by electron bombardment. During the bombardment period, the primary layer of zinc cadmium sulfide will store up much of this blue light energy. When the electron bombardment ceases, the fluorescence subsides immediately while the primary layer releases its energy as an intense phosphorescent glow. Thus, the image traced by the electron beam is retained for some time after the signal has ceased and is the method used in this instance to obtain very long persistence. When the screen is properly made the two layers remain well separated. However, it often happens during the process of manufacture, that the two layers become more or less mixed resulting in a defective tube. For the most part this unwanted mixing cannot be detected by a mere visual examination of the screen. But by practicing the present invention, screen mixing is very easily detected since it shows up at once in an analysis of the light output persistence measurements.

The invention provides means for reducing the screen to be tested to a base energy level and means to subject it to a standard excitation.

2

Means are also provided for recording the intensity of illumination on the screen at any time. This permits the recording of the fluorescent light output as well as the phosphorescent light output.

The invention also provides means for repeating the excitation at any desired interval so that the rate of accumulation of energy by a phosphorescent layer may be measured.

One of the primary requirements, from the standpoint of tube operation, of a screen of the cascade type, is that it have a high level of persistent light output. That is, the phosphorescence must have an absolute brightness level high enough to readily distinguish the signal. This absolute intensity is dependent upon the degree of excitation and the time after excitation at which it is observed. Therefore, any brightness measurement of persistent light must specify these conditions. If the symbol B is used to indicate the brightness of the persistent light, B–1 will indicate the persistent light intensity one second after a specified electron excitation of the screen.

Just as the excitation affects the persistent light intensity level, so the energy already possessed by the phosphor will affect it. The newly acquired energy will add to that already possessed to result in a higher phosphorescent level at any time after excitation than would be obtained if the phosphor were excited from zero energy level. It is important, then, in comparing luminescent screens, that the excitation of the phosphor be started at the same energy level as well as that the phosphor be excited to the same extent, and that its persistence be observed at the same time after excitation.

The cumulative increase in persistence light output, as described above, is a desirable screen characteristic in some types of screens such as the cascade type. The invention includes provisions for its measurement. Provision is made for starting the screen at zero energy level and subjecting it to a series of excitations at regular intervals. The ratio of the persistent light intensity at a specified time after the last excitation to the persistent light output at the same time after the first excitation, is termed the build-up ratio for that particular number of excitations. The build-up ratio will be designated as "G." An associated number will be used to designate the number of excitations. If B–1 indicates the brightness measured one second after the first excitation, B–5 would indicate the brightness one second after the fifth excitation. The ratio B-5/B-1 can be labelled G-5:1 which is the build-up ratio for five excitations.

It is also desirable in a cascade type screen such as the P7 to measure its efficiency. The primary efficiency is the intensity of fluorescence under a given electron bombardment. The secondary efficiency is the degree with which the fluorescent light energy becomes converted into phosphorescent light output. The secondary efficiency, only, is of importance in testing the long persistence type screen. The fluorescent light output "F" is measured and compared with the persistent light output B-1. The ratio F/B-1 has a maximum limit and will be expressed symbolically as FR, short for "flash ratio." The invention provides means and method for measuring this ratio.

One object of the invention, then, is to provide a method for reducing a luminescent screen to a zero energy level.

Another object is to provide a method of measuring the intensity of illumination on a screen at any given time.

Another object is to provide a method of measuring the rate of accumulation of energy by a screen containing phosphorescent components.

Another object is to provide a method of measuring the level of persistent light output of a screen containing phosphorescent components.

Still another object is to provide a method of measuring peak light output, or its equivalent, attained during excitation by electron bombardment.

A further object is to provide apparatus which may be employed in reducing a luminescent screen to a zero energy level.

Another object is to provide apparatus which may be employed in measuring the intensity of illumination on a screen at any given time.

Another object is to provide apparatus which may be employed in measuring the rate of accumulation of energy by a luminescent screen.

Another object is to provide apparatus which may be employed in measuring the level of persistent light output of a luminescent screen.

Another object is to provide apparatus which may be employed in measuring the peak light output attained by a luminescent screen during excitation by electron bombardment.

Another object is to provide apparatus which may be employed to subject a luminescent screen to a series of cycles of standard excitations.

These and other objects will be apparent from a more detailed description of the invention which follows:

Fig. 1A is a diagrammatic representation of apparatus that may be employed in reducing the screen to a predetermined energy level.

Fig. 3 is a representation of the type of trace obtained on the screen of the cathode ray oscilloscope when measuring B-1 or B-5.

Fig. 4 is a representation of the type of trace obtained on the screen of the cathode ray oscilloscope when measuring the flash ratio.

Figure 1:
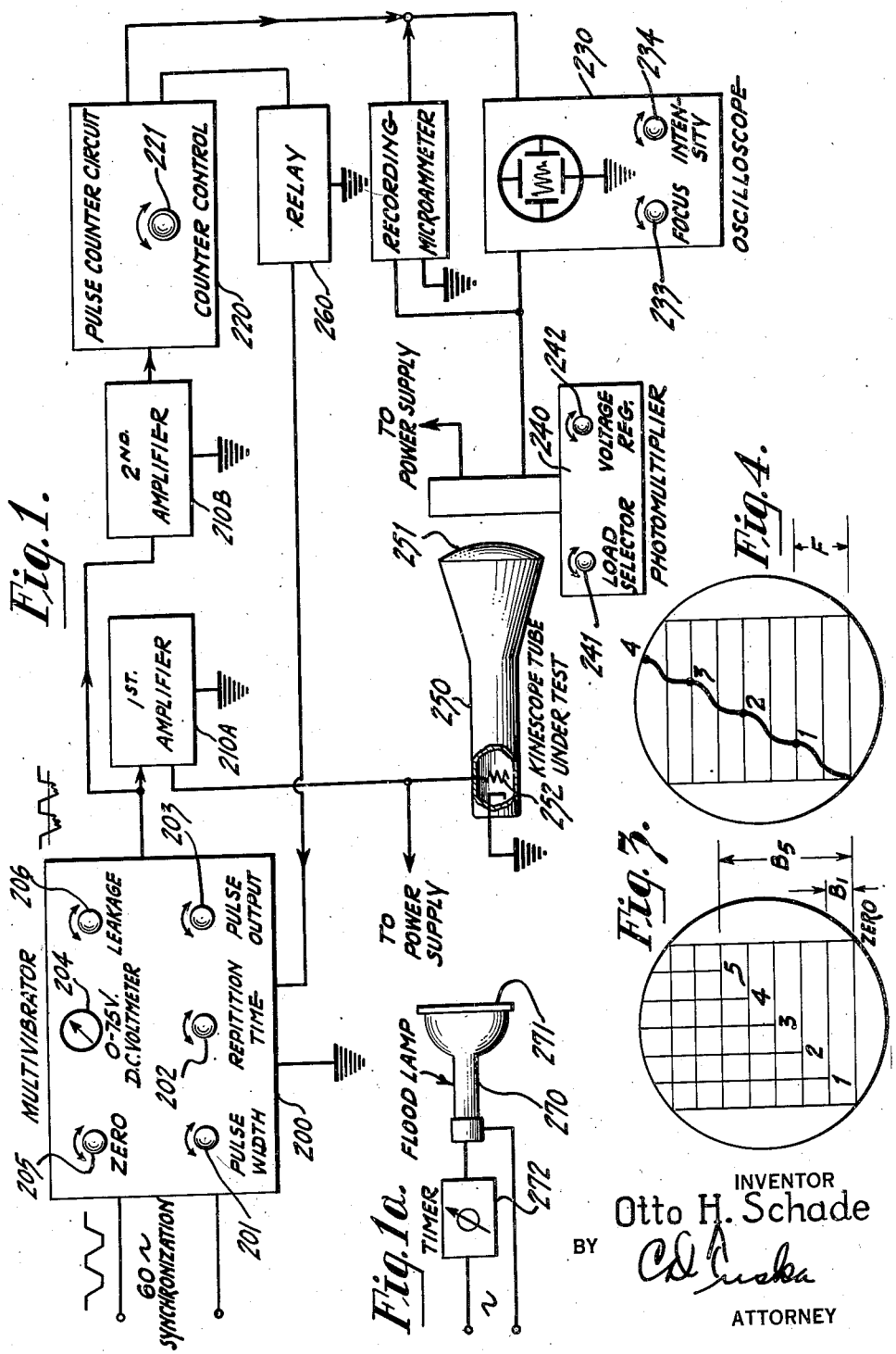
Fig. 1 is a diagrammatic representation of the type of apparatus which may be employed in the described method of measuring persistent light output.

As shown in Fig. 1, 250 represents a cathode ray tube having a luminescent screen 251 to be tested. Normal operating voltage is established by deflecting the cathode ray beam to form a raster 7 cm. x 7 cm. in size, tracing 200 to 250 horizontal lines in 1/60 sec.; i. e., the frequency of the vertical deflection is 60 cycles and for the horizontal deflection, 12,000 to 15,000 cycles. Immediately before the screen is tested the tube is biased beyond cut-off. The multivibrator 200 is set into operation and supplies a negative pulse voltage which is first converted to a positive pulse voltage in the first stage 210A of a buffer amplifier and then fed to the grid 252 of the cathode ray tube 250. By adjusting the pulse voltage control 203 of the multivibrator the magnitude of said voltage may be set to fire the tube at any predetermined beam current level. For example, if the persistence measurements are to be made at a beam current of 60 microamps, the control grid voltage may be set at −20 v. and the accelerator grid voltage adjusted so that the beam current is equal to 60 microamps. Then, if the tube is biased to −45 v. immediately before persistence measurement and the modulating pulse set for +25 v., the multivibrator will cause the tube to fire at 60 microamps each time the pulse comes through. Any equivalent operation that may be necessary due to tube type peculiarities will serve just as well. The desired voltage may be obtained from a potentiometer in the output circuit of the multivibrator and may be read from a D. C. meter such as indicated at 204. Pulse width control 201 on the panel of the multivibrator is used to supply a pulse of desired duration such as 1/60 second. The pulse width control varies a resistance which regulates the discharge rate of the multivibrator by varying the point at which the multivibrator cuts off.

Standard methods of screen excitation also specify that the above described pulse voltage be repeated at one second intervals. Proper timing may be obtained utilizing the synchronizing pulse supplied by the cathode ray tube or better still by a microswitch operated by a small synchronous motor connected in the line which supplies 60 cycle synchonizing pulses to the multivibrator. The control 202 on the multivibrator panel varies a resistor which may be used to control the interval of repetition.

A second portion of the output of the multivibrator is diverted through the second stage 210B of the buffer amplifier where the pulses are changed to positive and considerably amplified. These amplified pulses are then fed into a pulse counter circuit 220 having a control 221 for varying the number of pulses in each cycle. The principle of operation involved here is that a condenser is charged in a predetermined number of steps corresponding to the desired number of pulses in each cycle and when the charge becomes high enough it will operate relay 260 which impresses a negative voltage on the multivibrator sufficient to bias it off. Usually the control 221, which operates a variable resistor, is set to provide a number of pulses between 3 and 8. The counter circuit also provides the time base deflection for the oscilloscope 230.

Before the screen 251 of tube 250 can be tested it is important that the screen be reduced to zero energy level. This is easily and conveniently done by placing before the screen, floodlamp 270, shown in Fig. 1A, having a clip-on red filter. The lamp may be a G. E. 150 watt floodlamp and the filter of the type known as "footlight red" which transmits energy above 6500 angstrom units. The lamp is turned on and placed before the screen for a regulated time which may be set by timer 272. In general, good screen deactivation can be accomplished in from 15 to 30 seconds.

A suitable switch sets the pulsing cycle of the multivibrator in operation and a regulated number of pulses is applied to the grid 252 of tube 250. For the running of the test, the floodlamp 270 is removed from in front of the screen and a No. 931 photomultiplier tube 240 put in its stead. This photomultiplier tube is excited by the light traces on screen 251 which, of course, have been caused by electron bombardment controlled by the pulses supplied to grid 252. The photomultiplier supplies an amplified electron current proportional to the light output of the screen at any instant. By means of a voltage regulator 242 the voltage per stage of the phototube may be varied in 150 volt steps for calibrating purposes. The unit also has a plate load selector switch 241 for varying the gain. The adjustment of the plate load is necessary in order to get the trace on the oscilloscope within a readable or accurate range.

The readings from which built-up and flash ratio (FR) are calculated, are taken from a long persistence oscilloscope 230 such as a 5CP7, having a P7 screen. It is also possible to use a G. E. recording meter for this purpose. This meter is a recording microammeter listed by the General Electric Company as their No. 32C68. Both the G. E. meter and the oscilloscope can also be used at the same time for purposes of comparison.

The output current of the photomultiplier, which is proportional to the intensity of illumination of the screen under test, is passed through a suitable load resistor and impresses voltages on the deflecting plates of the oscilloscope proportional to light output. By means of a calibrated scale on the face of the tube, the spot deflection can be read directly in millifoot lamberts or any equivalent light unit. The horizontal sweep of the oscilloscope is synchronized with the pulses of the multivibrator. The gain is adjusted to measure low persistent light output. Using this adjustment, flash will deflect the spot off the screen so that persistence of the phosphorescent light and flash cannot be measured at the same time. With proper gain adjustment and proper load selection and traces on the oscilloscope screen will appear as a series of unconnected vertical lines as shown in Fig. 3. As indicated in the figure B-1 is measured by the vertical interval between the zero line on the oscilloscope screen and the lower end of the first light trace. B-5 would be measured by the interval between the zero line and the lower end of trace number 5. In making persistence measurements, when B-1 is in a readable area, B-5 may be off the screen. But both B-5 and B-1 may be read at the same time if the load selector switch 241 is changed to the next lower position just after B-1 is clearly recorded on the screen.

For flash measurements, the load switch 241 is merely set on a capacitive load which stores up the total light energy from the screen during the second. The screen undergoes the same excitation as in the persistence measurements. The trace on the screen in this case is a series of rounded steps as shown in Fig. 4. The reading is recorded in the same units as B-1, noting the value of the capacitive load used. Calculations can be made later to convert this reading to milli-foot lamberts.

In order to get a purely numerical value for the ratio F/B-1, the oscilloscope readings may be converted to absolute milli-foot lamberts as follows. If a high gain photomultiplier tube is used the oscilloscope can be calibrated for milli-foot lamberts on the 2 megohm position, see 63, Fig. 2. Spot deflection on the oscilloscope is always proportional to the voltage applied to the vertical plates (46B in Fig. 2). Therefore, when a pure resistance load is used for deflection plate bias, deflection will be proportional to the product of load current in the photomultiplier and the resistance load. Therefore, deflection is proportional to voltage and $V=I_AR_L$ where $I_A$ is the load current and $R_L$ is the resistance load. If a capacitive load is used, however, the voltage causing deflection becomes equal to $$\frac{Q}{C}=\frac{I_At}{C}$$

where $t$ is the charging time for the capacitance C. For equal spot deflection on respective loads then $$I_AR=\frac{I_At}{C}$$

The values of $R_L$ and C will always be known for any particular measurement since they are read directly from the instrument. However, the charging time must be determined. Taking into consideration the response of the human eye which tends to average out the light intensity rather than record the peak, the charging time is assumed to be .1 second.

The equivalent resistance $R_L$ of a 2 ufd condenser would then be $$R_L=\frac{t}{c}=\frac{1}{2\times 10^{-8}}=.05 \text{ megohms}$$

If the unit is calibrated in milli-foot lamberts on a 2 megohm resistance, all readings made on the 2 ufd position must be multiplied by $$\frac{2}{.05}$$

or 40 to obtain flash measurements in milli-foot lamberts. Similar calculations can be made for other capacitances, other calibrating positions or both.

Using the focusing control 233 and the intensity control 244 on the oscilloscope panel, the spot size and intensity may be adjusted for most accurate reading. The zero control 205 on the multivibrator panel biases the plates of the oscilloscope so that the deflections are started from a zero base line. The leakage control 206 compensates for inherent leakages in the photomultiplier.

A more specific example of an operating circuit embodying apparatus which may be employed in the invention will now be described in detail.

Figure 2:
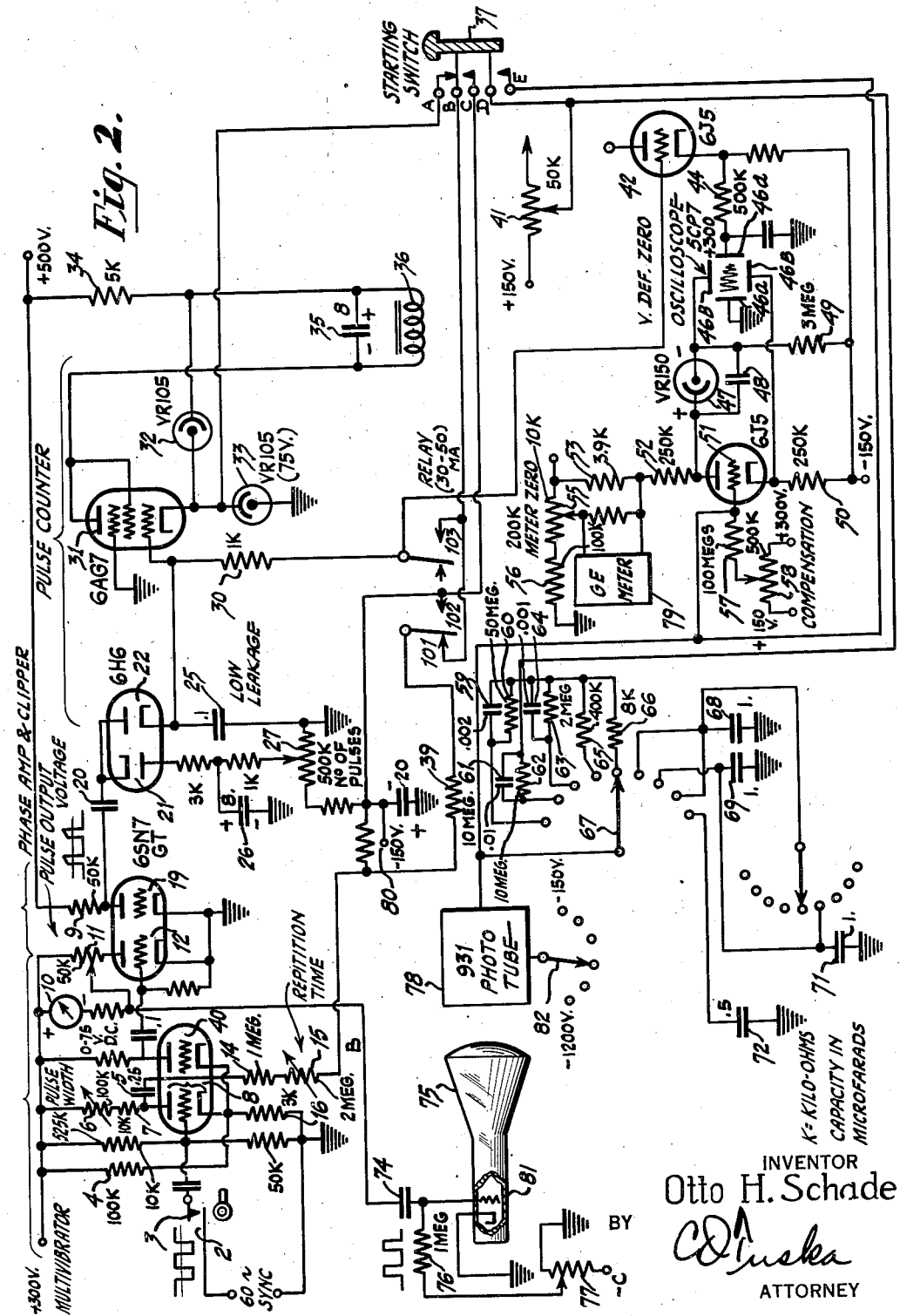
Fig. 2 is a detailed example showing one embodiment of apparatus which may be employed in the measurement procedure.

As shown in Fig. 2, a synchronous motor 1 closes the contacts of a microswitch 2 for a brief time interval, such as $\frac{1}{10}$ second during each revolution, allowing 60 cycle synchronizing pulse groups to pass only while the contacts are closed.

The pulse groups are fed to a multivibrator over coupling condenser 3. The multivibrator has two units of a 6N7 tube 8 and 40, connected as a multivibrator with conductive feedback in the cathode circuit. The bias of unit 40 is obtained from a bleeder between the −150 v. source 80 and the +75 v. source 33 which latter is a glow tube connected to ground. Bleeder resistors 29 and 39 are used to adjust the bias at point B to several volts negative. This plus the voltage developed across the cathode resistor 16 presents a bias to the multivibrator sufficient to keep it from firing unless triggered by the synchronizing pulses.

The cathode resistor 4 is used to provide a higher bias for tube unit 40, while 6 is the pulse width control resistor used to adjust the charging time of condenser 5 connected between the plate and grid of tube units 8 and 40 respectively. This control resistor also has a fixed portion 7.

The multivibrator supplies controlled voltage pulses after amplification by tube 12 to the grid 81 of the tube 75 under test. The repetition time of these pulses is set by adjusting the variable resistor 15 which, together with grid resistor 14, is connected to the grid of tube 40.

In order to have each pulse of proper time duration or width, the width control is adjusted by means of width control 6 which is a potentiometer hooked up in the plate circuit of tube unit 8. The pulse output voltage is adjusted by potentiometer 11 and may be read on the D. C. voltmeter 10 in the plate circuit of the pulse amplifying tube 12. The tube 12 which is a buffer amplifier serves to change the negative pulses of the multivibrator to positive pulses and also to clip the ends of the pulses so that a square voltage wave is obtained. The plate circuit of tube unit 40 is coupled to the grids of buffer tubes 12 and 19 through condenser 13.

The output of the multivibrator is also connected to a parallel buffer amplifier tube 19, having plate load resistor 9, which may be one unit of a 6SN7-GT, and produces positive pulses and also greatly amplifies them for feeding into the pulse counter circuit over the series condenser 20. This condenser divides the pulse voltage between itself and condenser 25. The amplified positive pulses supplied to the counter circuit have an average magnitude of about 400 volts.

The counter circuit consists mainly of two 6H6 diodes 21 and 22 connected in inverted relationship and a 6AG7 pentode 31. During the positive pulse time the condenser 25 is charged in series with condenser 20 over diode 22. Condenser 20 is then discharged during the negative part of the cycle over the inverted diode 21. Diode 21 is connected to ground through by-pass condenser 26. Each time a positive pulse occurs condenser 25 is given a fractional increase of charge. For practical considerations, since about 200 volts are required to deflect the spot five inches on the screen of oscilloscope 46 the total final charge on condenser 25 is taken at about 175 volts. When six pulse steps are desired, the condenser is then charged 30 v. at each step. The ratio of condensers 20 and 25 is selected to divide the pulse voltage from tube 19 down to the approximate step voltage. The potentiometer 27 acts as a control to set the exact number of steps.

In the "off" position, relay 36 is energized, closing contacts 103 and 102, with 103 connecting the grid of the 6AG7 tube over the push button contacts a, b to cathode, thus maintaining current flow in the 6AG7 plate circuit. The multivibrator (8 and 40) is stopped by a −150 v. bias at points B as contact 102 is closed.

When push button 37 is first depressed, condenser 25 is connected and instantly charged to −150 v. over contacts b, c and 103. Relay 36 snaps then to the "pulsing" condition, as −150 v. is also applied to the grid of tube 31 across current limiting resistor 39, for which the contacts are set as in Fig. 2. The condenser 25 discharges now over diodes 21 and 22 in series to a negative value determined by the potentiometer 27, as the relay contact 103 is now open. Thus the potentiometer acts as a step number control by varying the amount of charge left on condenser 25. Release of 37 applies +75 v. from 33 over contacts a, b and 101 to resistor 34, thus starting the multivibrator (8 and 40) to furnish pulses to tube 19.

The voltage on condenser 25 increases thus in steps until the negative bias on tube 31 (provided by 75 v. glow tube 32 and adjustable negative bias from potentiometer 27) is exceeded, causing tube 31 to energize relay 36 through its plate current. Cathode bias is also supplied to tube 31 through glow tube 33 while 34 is a current limiting resistor to protect glow tube 32. Energizing relay 36 causes contact 103 to close which closing connects the control grid of tube 31 to the cathode. This causes relay 36 to hold until contact a is opened by again depressing the starting switch. The multivibrator is blocked also since contact 102 is closed. The closing of contact 102 increases the bias of tube 40 by −150 v.

The pulse group is thus started by depressing starting switch 37, breaking contact a. The plate current continues to flow at first because of the charge on condenser 25 and the multivibrator remains blocked because contact 102 is still closed. It remains blocked also when the discharge contact b on the starting switch applies −150 v. over relay contact 103 to both the grid of tube 31 and condenser 25. Relay condenser 35 causes sufficient time delay to permit discharge of condenser 25 to −150 v. before contact 103 breaks the discharge circuit. Condenser 25 is then charged over diodes 21 and 22 to the exact voltage set on potentiometer 27 which controls the number of charging steps and hence the number of pulses.

The multivibrator remains blocked until release of the starting switch closes contact a, applying +75 v. over contact 101 through the bleeder resistor 39 for the multivibrator bias and returning point "B" to operating potential. The cycle then repeats as described. The grid bias of the cathode ray tube under test is controlled by the variable resistor 77 which is connected to grid 81 through resistor 76. 74 serves as a coupling condenser for tube 75. The light flashes on the screen of cathode ray tube 75 are picked up by the No. 931 photomultiplier tube 78. The power supply of the photomultiplier tube (not shown) has a switch 82 for varying the voltage in 150 v. steps. A vernier control may be used to vary the voltage between the 150 v. steps.

The gain of the photomultiplier tube is varied through switch 67 the highest gain being with the 50 megohm load and the lowest with the 80,000 ohm load. The load resistances 60, 62 and 63 are bypassed with condensers, numbered respectively 59, 61, and 64 so as to keep a clean spot with high gains on the oscilloscope 46. The smaller load resistors 65 and 66 do not need to be bypassed. Also on the load switch 67 are positions for obtaining various capacitances, numbered 68, 69, 71, and 72, for integrating the light pulses when a G. E. recording meter is used. To compensate for leakage to ground on stray light signal, a positive voltage is taken from potentiometer 58, marked "compensation," and fed over resistor 57 to buck out the leakage current.

The readings from which build-up and flash-ratio are calculated are taken from either a long persistence oscilloscope such as a 5CP7, 46, or a G. E. recording meter 79. Where it is desired to use both instruments together, centering voltage from potentiometer 55, connected to ground through resistor 56, is adjusted so that both the meter and oscilloscope track when the "vertical deflection zero" control is adjusted to the zero line on the oscilloscope. When the G. E. meter is not used a 1800 ohm resistance is substituted for it.

The horizontal deflection plate 46a of the oscilloscope 46 is coupled to the step voltage on 25 by a cathode drive D. C. amplifier tube 42. The plate of tube 42 is connected to a +300 v. power supply while the cathode is connected to a —150 v. power supply through cathode coupling resistor 43. The cathode of tube 42 is connected to ground over damping resistor 44 and bypass condenser 45. The resistor aids in obtaining a clean spot on the oscillograph at low deflection voltages while 44 and 45 together act as a filter for high frequencies. The vertical deflection plates 46B are plate and cathode coupled by tube 51. Potentiometer 41 is for setting the zero level on the vertical oscillograph deflection by adjusting the grid bias on tube 51. The cathode of tube 51 is connected to the —150 v. power supply through cathode resistor 50 while the plate is connected to the +300 v. power supply through resistors 52 and 53. D. C. coupling is achieved through a 150 v. glow tube 47, bypassed by condenser 48, and acting as a negative bias battery. The glow tube requires a small bleeder current through resistor 49.

Readings are taken on the oscilloscope as described previously with the aid of block diagram, Fig. 1. For calibration purposes a 5FP7, which is a long persistence cathode ray tube, of known calibration, is utilized.

I claim as my invention:

1. In an apparatus for measuring the light output characteristics of a luminescent screen, means for reducing said screen to a predetermined energy level, means for applying to said screen light producing excitations of predetermined intensity, duration, number, and spacing, means for detecting the light output due to said excitations, and means for recording the signals generated by said light output detecting means.

2. In apparatus for measuring the light output characteristics of a cathode ray tube screen, a multivibrator for supplying successive cycles of standard electron excitations to said screen, a pulse counter circuit for limiting the number of excitations per cycle, a photomultiplier tube for picking up the light output on said screen due to said electron excitations and converting them into a corresponding electron current, and means associated with said photomultiplier tube for recording fluctuations in said electron current.

3. In apparatus for measuring the light output characteristics of a cathode ray tube screen, a multivibrator for supplying successive cycles of standard electron excitations to said screen, a pulse counter circuit for limiting the number of excitations per cycle, a photomultiplier tube for picking up the light output on said screen due to said electron excitations and converting them into a corresponding electron current, and a cathode ray oscilloscope associated with said photomultiplier tube for recording fluctuations in said electron current.

4. A method of measuring the light output characteristics of a luminescent screen which method comprises reducing the screen to a basic energy level, supplying to said screen a series of excitations having predetermined intensity, duration, number, and spacing, detecting the light output due to said excitations, and recording the signals corresponding to said light output at any given time.

5. A method of measuring the light output characteristics of a luminescent screen which method comprises reducing the screen to a zero energy level, supplying to said screen a series of electron excitations having predetermined intensity, duration, number, and spacing, detecting the light output due to said excitations and recording the signals corresponding to said light output on a calibrated scale.

6. A method of measuring the persistence light output of a cascade type luminescent screen which method comprises reducing the screen to zero energy level, supplying to said screen a series of excitations having predetermined intensity, duration, number, and spacing, detecting the light output due to said excitations and recording the signals corresponding to said light output after the first excitation and after the final excitation of said series.

7. A method of measuring the flash ratio of a cascade type luminescent screen which method comprises reducing the screen to a basic energy level, supplying to said screen a series of electron excitations having predetermined intensity, duration, number, and spacing, connecting a capacitive load into a photoelectric detecting circuit for storing up the energy detected during each excitation, detecting the total light output due to said excitations and recording the signals corresponding to said light output.

8. A method of rating the persistence light output of a cascade type luminescent screen which method comprises reducing the screen to a basic energy level, supplying to said screen a series of standard electron excitations, detecting the light output due to said excitations, recording the signals corresponding to said light output at any given time and comparing the recorded signals with those obtained on a standardized recorder of a type similar to the first mentioned recorder.

9. A method of measuring the light output characteristics of a luminescent screen which method comprises reducing the screen to a basic energy level, supplying to said screen a series of standard electron excitations, detecting the light output due to said excitations, and recording the signals corresponding to said light output on the calibrated screen of a cathode ray oscilloscope.

10. In an apparatus for measuring the light output characteristics of a luminescent screen, a multivibrator for supplying successive cycles of standard electron excitations to said screen, a phase inverting pulse amplifier associated with said multivibrator and a pulse counter circuit connected to the output circuit of said amplifier, said pulse counter circuit limiting the number of excitations supplied to the screen during each cycle of the multivibrator, photoelectric means for detecting the light output of said screen due to said excitation and for converting said detected output into an electron current, and means actuated by said electron current for recording the value thereof.

11. In apparatus for measuring the persistent light output characteristics of a phosphor coated screen, means for applying to said screen successive cycles of electron excitations having a predetermined intensity, means for varying the number of said excitations per cycle, means responsive to the light output of said screen due to said excitations for converting said excitations into a corresponding electron current, and means responsive to said electron current for recording the fluctuations of said current.

12. In apparatus according to claim 11, means for reducing said screen to a basic energy level before applying said electron excitations thereto.

13. In an apparatus for measuring the persistent light output of a phosphor coated screen, means for applying to said screen a series of electron excitations, means for varying the spacing of the excitations in said series, means for detecting the light output of said screen due to said excitations and means synchronized with said spacing means for recording signals generated by said light output detecting means.

14. In an apparatus for measuring the persistent light output of a phosphor coated screen, means for applying to said screen a series of electron excitations, means for varying the spacing of the excitations in said series, means for detecting the light output of said screen due to said excitations and means synchronized with said spacing means for recording the signals generated by said light output detecting means in response to each of said excitations separately.

15. An apparatus according to claim 13 including means for actuating said recording means at any desired time interval after the occurrence of each of said excitations.

16. In an apparatus for measuring the persistent light output of a phosphor coated screen, means for applying to said screen a series of electron excitations, means for spacing said excitations, means for detecting the light output of said screens due to said excitations and means synchronized with said spacing means for recording signals generated by said light output detecting means.

17. In apparatus for measuring the persistent light output characteristics of a luminescent screen, means for supplying electron excitations to said screen, a multivibrator connected to said supplying means for controlling the spacing and intensity of said excitations, means for detecting the light output on said screen due to said excitations and means for recording the signals generated by said light output detecting means in response to the light output of said screen.

OTTO HEINRICH SCHADE.

REFERENCES CITED

The following references are of record in the file of this patent:

UNITED STATES PATENTS

| Number | Name | Date |
|---|---|---|
| 2,073,247 | Miller | Mar. 9, 1937 |
| 2,193,606 | Ulrey | Mar. 12, 1940 |
| 2,240,722 | Snow | May 6, 1941 |

OTHER REFERENCES

Zworykin, "An Automatic Recording Spectroradiometer for Cathodoluminescent Materials," J. O. S. A., Feb. 1939, pp. 84 to 91.